United States Patent
Jung et al.

(10) Patent No.: US 7,602,202 B2
(45) Date of Patent: Oct. 13, 2009

(54) SEMICONDUCTOR PROBE WITH HIGH RESOLUTION RESISTIVE TIP HAVING DOPING CONTROL LAYER AND METHOD OF FABRICATING THE SAME

(75) Inventors: Ju-hwan Jung, Seoul (KR); Jun-soo Kim, Seoul (KR); Hyung-cheol Shin, Seoul (KR); Seung-bum Hong, Seongnam-si (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 250 days.

(21) Appl. No.: 11/652,596

(22) Filed: Jan. 12, 2007

(65) Prior Publication Data
US 2007/0176616 A1    Aug. 2, 2007

(30) Foreign Application Priority Data
Jan. 13, 2006   (KR) .............. 10-2006-0003934

(51) Int. Cl.
*G01R 31/02* (2006.01)
*G01R 31/26* (2006.01)

(52) U.S. Cl. ............... 324/757; 324/762; 438/14
(58) Field of Classification Search ......... 324/757, 324/762
See application file for complete search history.

(56) References Cited

U.S. PATENT DOCUMENTS

| 5,923,033 A | 7/1999 | Takayama et al. |
| 6,028,436 A * | 2/2000 | Akram et al. ............ 324/755 |

FOREIGN PATENT DOCUMENTS

| JP | 2000-67478 A | 3/2003 |
| JP | 2003-0087372 A | 11/2003 |
| WO | WO03-096409 | * 11/2003 |
| WO | WO 03/096409 A1 | 11/2003 |

* cited by examiner

*Primary Examiner*—Ha Tran T Nguyen
*Assistant Examiner*—Karen M Kusumakar
(74) *Attorney, Agent, or Firm*—Sughrue Mion, PLLC

(57) ABSTRACT

A semiconductor probe and a method of fabricating the same are provided. The semiconductor probe includes a cantilever doped with first impurities, a resistive tip which protrudes from an end of the cantilever and doped lightly with second impurities, doping control layers formed on both sides of a protruding portion of the resistive tip, and first and second electrode regions formed under the doping control layers and doped heavily with the second impurities.

5 Claims, 9 Drawing Sheets

SEMICONDUCTOR PROBE WITH HIGH RESOLUTION RESISTIVE TIP HAVING DOPING CONTROL LAYER AND METHOD OF FABRICATING THE SAME

CROSS-REFERENCE TO RELATED PATENT APPLICATIONS

This application claims priority from Korean Patent Application No. 10-2006-0003934, filed on Jan. 13, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a semiconductor probe and a method of fabricating the same and, more particularly, to a semiconductor probe with a high resolution resistive tip having a doping control layer for controlling distribution of impurities and a method of fabricating the semiconductor probe.

2. Description of the Related Art

As the demand for portable devices such as mobile phones increases, the demand for small-sized, high-integration non-volatile recording media also increases. It is difficult to reduce the size of a conventional hard disk and it is difficult to increase conventional flash memory integration. Therefore, in recent years, much research has been done concerning an information storage device using a scanning probe.

A probe is used in a variety of scanning probe microscopy (SPM) technologies. For example, the probe is used in a scanning tunneling microscope (STM) for reading information by detecting a current that flows according to a voltage difference between the probe and a sample, an atomic force microscope (AFM) for reading information by using an atomic force generated between the probe and the sample, a magnetic force microscope (MFM) for reading information by using a force generated between a magnetic field of the sample and the magnetized probe, a scanning near-field optical microscope (SNOM) for improving a resolution limitation caused by a wavelength of a visible ray, an electrostatic force microscope (EFM) for reading information by using an electrostatic force generated between the sample and the probe, and the like.

In order to write and read information densely at a high speed using the STM technology, it must be possible to detect surface electric charges existing in a region having a diameter of tens of nanometers. In addition, in order to improve the writing/reading speed, it must be possible to fabricate a cantilever in an array structure.

A conventional cantilever having a resistive tip is disclosed in PCT publication No. WO 03/096409.

FIG. 1 is a sectional view of the related art cantilever with the resistive tip.

A resistive tip 10 is vertically arranged on a cantilever 11 in an array structure. Referring to FIG. 1, the resistive tip 10 includes a body 14 doped with first impurities, a resistive region 13 formed on an apex of the tip 10 and doped with second impurities, and first and second semiconductor electrodes 12 and 15 between which the resistive region 13 is formed. The resistive region 13 has a diameter of tens of nanometers. The first and second semiconductor electrodes 12 and 15 are doped with the second impurities.

In the process of forming the resistive tip 10, the first and second semiconductor electrodes 12 and 15 formed on the inclined surface of the tip 10 are excessively wet-etched, thereby reducing the area of the inclined surface that is heavily doped. Therefore, the conductive area is reduced in the inclined surface, resulting in the spatial resolution of the resistive region 13 deteriorating. In addition, in the fabrication process, a portion where the probe will be formed after the etching process is performed may be damaged due to a relatively high ion implantation energy of about 300 keV. Furthermore, there is a need to perform not only a thermal diffusion process, i.e., an annealing process at 1000° C. for 12 hours, but also a thermal oxidation process at 1000° C. for 30-40 minutes.

SUMMARY OF THE INVENTION

The present invention provides a semiconductor probe with a high resolution resistive tip having a doping control layer.

The present invention also provides a method of fabricating a semiconductor probe with a high resolution resistive tip having a doping control layer, in which the ion implantation is performed using relatively low energy and a thermal annealing process time is shortened.

According to an aspect of the present invention, there is provided a semiconductor probe including: a cantilever doped with first impurities; a resistive tip which protrudes from an end of the cantilever and which is doped lightly with second impurities; doping control layers formed on opposite sides of a protruding portion of the resistive tip; and first and second electrode regions formed under the doping control layers and doped heavily with the second impurities.

The resistive tip may be formed in a square pillar shape and has a width less than 100 nm, and, for example, within a range of 10-50 nm.

The doping control layer comprises at least one of an insulation material and a metal material.

The metal material may be selected from Al, Ti, W, Sn, Cu, and Cr.

According to another aspect of the present invention, there is provided a method of fabricating a semiconductor probe having a resistive tip formed on an end of a cantilever, the method including: forming a stripe pattern mask on a substrate doped with first impurities; forming a stripe pattern protruding portion by etching the substrate using the stripe pattern mask; forming doping control layers on opposite sides of the stripe pattern protruding portion; and forming first and second electrode regions by doping the substrate with second impurities through an exposed surface of the substrate, for example, at side portions of the doping control layers.

The method may further include forming a stripe pattern photosensitive layer on the substrate in a direction crossing the stripe pattern protruding portion at a right angle, forming the resistive tip by etching the stripe pattern protruding portion and the substrate using the stripe pattern photosensitive layer as a mask, and forming the cantilever by etching a bottom surface of the substrate so that the resistive tip is located on the end of the cantilever.

The forming of the doping control layers may include depositing at least one of an insulation material and a metal material on the stripe pattern mask and the substrate and forming the doping control layers on opposite sides of the stripe pattern protruding portions while exposing the stripe pattern mask and the surface of the substrate by anisotropically etching the layer formed by depositing the insulation material or the metal material.

An ion implantation energy for the substrate may be less than 10 keV.

The forming of the first and second electrode regions may include activating the first and second electrode regions by treating the substrate using a rapid thermal annealing process.

A width of the stripe pattern mask may be less than 100 nm.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF EXEMPLARY EMBODIMENTS OF THE INVENTION

Figure 1:
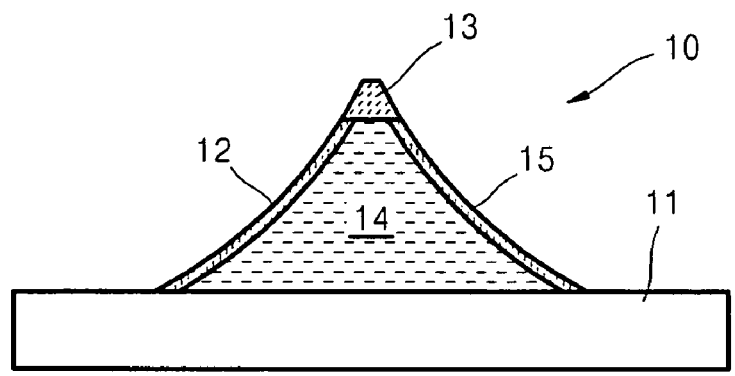
FIG. 1 is a sectional view of a related art cantilever with a resistive tip.

The present invention will now be described more fully with reference to the accompanying drawings, in which exemplary embodiments of the invention are shown. In the drawings, the thicknesses of layers and regions are exaggerated for clarity.

Figure 2:
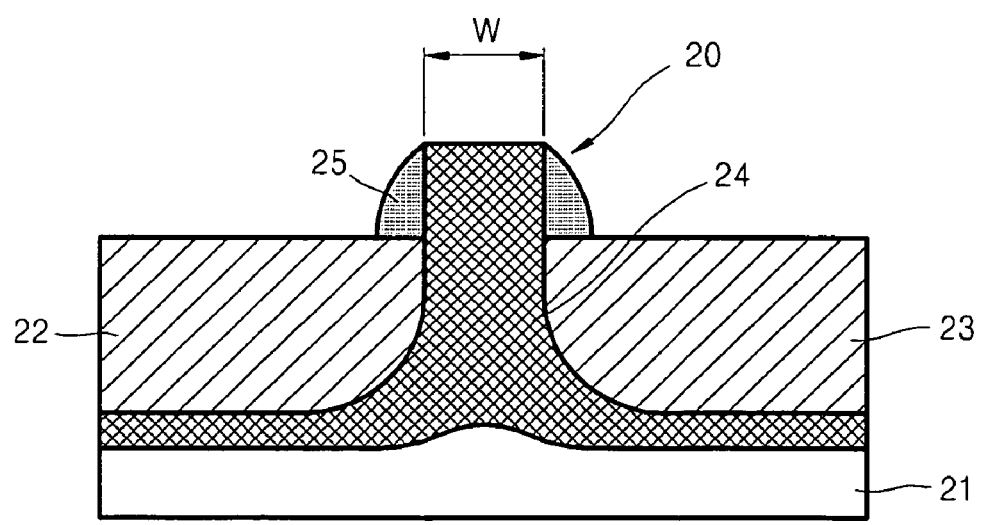
FIG. 2 is a cross-sectional view of a tip portion of a semiconductor probe with a high resolution tip having a doping control layer according to an exemplary embodiment of the present invention.

FIG. 2 is a cross-sectional view of a tip portion of a semiconductor probe with a high resolution tip having a doping control layer according to an exemplary embodiment of the present invention.

Referring to FIG. 2, a resistive tip 20 is formed on an end of a cantilever 21 which is formed of a silicon substrate doped with first impurities and protrudes upward from the surface of the cantilever 21 in a vertical direction. The resistive tip 20 has a low resistive region 24 lightly doped with second impurities different in polarity from the first impurities. Doping control layers 25 are formed on both sides of a protruding portion of the low resistive region 24 above the surface of the cantilever 21. First and second electrode regions 22 and 23 heavily doped with the second impurities are formed under the doping control layers 25. The cantilever 21, the resistive tip 20, and the first and second electrode regions 22 and 23 may be formed in the course of predetermined processes for doping the impurities. In this case, the first impurities may be p-type impurities and the second impurities may be n-type impurities.

A width W of the resistive tip 20 may be identical to that of a mask used in a fabrication process that will be described later. For example, when the width W of the resistive tip 20 is 100 nm, the ion implantation energy for forming the first and second electrode regions 22 and 23 can be reduced to, for example, 10 keV. Therefore, damage to the probe can be prevented during the ion implantation process. The first and second electrode regions 22 and 23 must be formed within a limited region by the doping control layers 25 formed on both sides of the resistive tip 20, thereby improving the sensitivity of the resistive tip 20 while maintaining its current resolution. According to this embodiment, the width W of the resistive tip 20 may be lower than 100 nm, for example, 50 nm, in order to provide high resolution.

When arsenic (As) is implanted at an ion implantation energy of 10 keV to form the first and second electrode regions 22 and 23, the distribution of the As density varies according to depth. At this point, the depth where the As density becomes the highest is a projected range. The depth where the As density becomes the highest is about 10 nm. The lateral distribution of As from an end of an ion implantation mask is about 30-40% of the As distribution from the end of the ion implantation mask to the projected range. In addition, the spatial resolution of the resistive tip 20 increases as the width of the resistive tip 20 is reduced. However, when the width of the ion implantation mask defining the width of the resistive tip 20 is reduced, it may be difficult to prevent a short circuit between the first and second electrode regions 22 and 23 due to a thermal annealing process performed following the completion of the ion implantation process. This problem can be solved by providing the doping control layers 25 formed on both sides of the resistive tip 20 and by increasing the width of the ion implantation mask. When the doping control layers 25 are formed of a metal material, they can function as a shield for the resistive tip 20, thereby improving the spatial resolution.

The first and second electrode regions 22 and 23 prevent the surface electric charges of a recording medium from affecting a region other than the resistive tip 20. Therefore, the electric field generated by the surface electric charges of the recording medium causes the variation of the resistance value of the resistive tip 20. The polarity and quantity of the surface electric charges can be accurately detected from the variation of the resistance value of the resistive tip 20.

Figure 3:
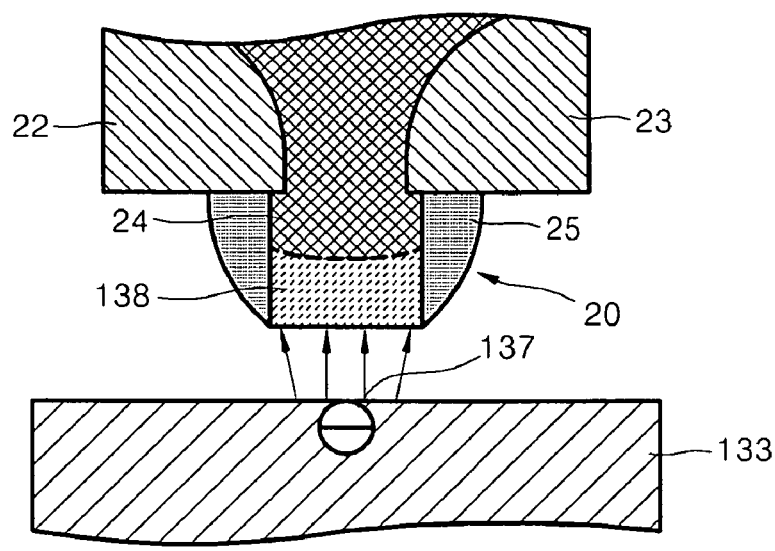
FIG. 3 is a cross-sectional view of a recording medium and the semiconductor probe with the high resolution tip having the doping control layer according to an exemplary embodiment of the present invention.

FIG. 3 is a cross-sectional view of the recording medium and the semiconductor probe with the high resolution tip having the doping control layers according to an exemplary embodiment of the present invention.

Referring to FIG. 3, when the surface electric charges 137 of the recording medium 133 are detected, the area of the low resistive region 24 of the resistive tip 20 is reduced by a depletion region 138 that is nonconductive even when it extends to the first and second electrode regions 22 and 23. Therefore the polarity and quantity of the surface electric charges 137 of the recording medium 133 can be detected due to the varying resistance value of the low resistive region 24. It is shown that the depletion region 138 formed in the low resistive region 24 gradually extends to the first and second electrode regions 22 and 23 due to the electric field generated by the surface electric charges 137. Since a short circuit between the first and second electrode regions 22 and 23 functioning as conductive layers can be prevented by the doping control layers 25, the electric current path is maintained by the resistive tip 20 and it is easy to fabricate the resistive tip 20 having the improved spatial resolution.

FIGS. 4A through 4I are views of a method of fabricating the semiconductor probe with the high resolution tip having the doping control layer according to an exemplary embodiment of the present invention.

Figure 4A:
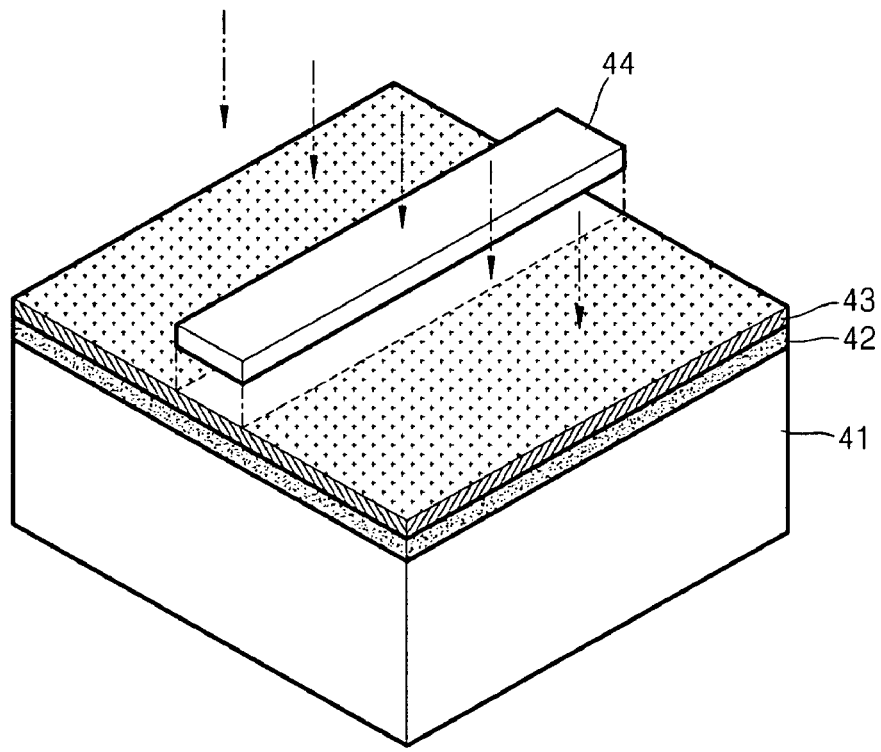
FIGS. 4A through 4I are views of a method of fabricating a semiconductor probe with a high resolution tip having a doping control layer according to an exemplary embodiment of the present invention.

Referring first to FIG. 4A, a mask layer 42 such as a silicon oxide layer or a silicon nitride layer is formed on a silicon substrate 41 doped with first impurities and a photosensitive layer 43 is formed on the mask layer 42, after which a stripe pattern mask 44 is disposed on the photosensitive layer 43.

Figure 4B:
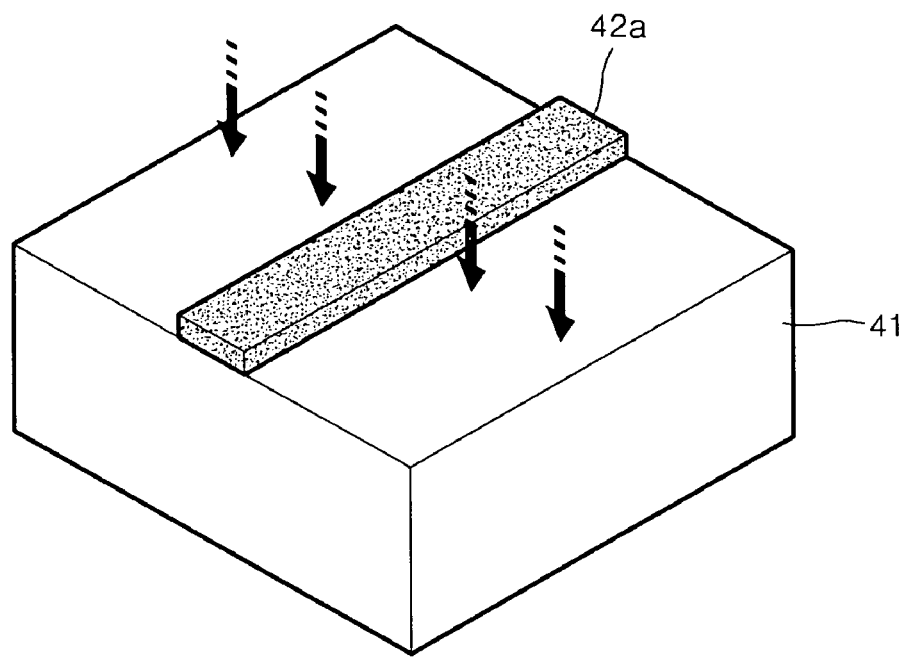

Referring to FIG. 4B, a stripe pattern mask 42a is formed on the substrate 41 by using light-exposing, developing and etching processes. At this point, a width of the stripe pattern mask 42a is less than 100 nm, for example, within a range of 10-50 nm.

Figure 4C:
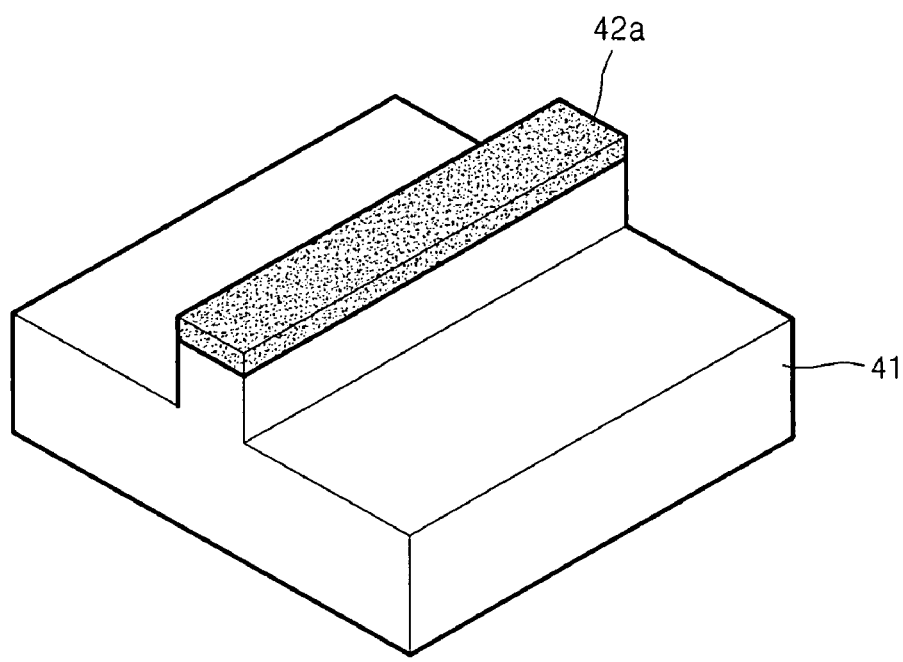

Referring to FIG. 4C, the substrate 41 is dry-etched to a depth less than 100 nm using the stripe pattern mask 42a. As a result, a stripe pattern protruding portion is formed on the substrate 41. This stripe pattern protruding portion functions as a resistive tip region later.

Figure 4D:
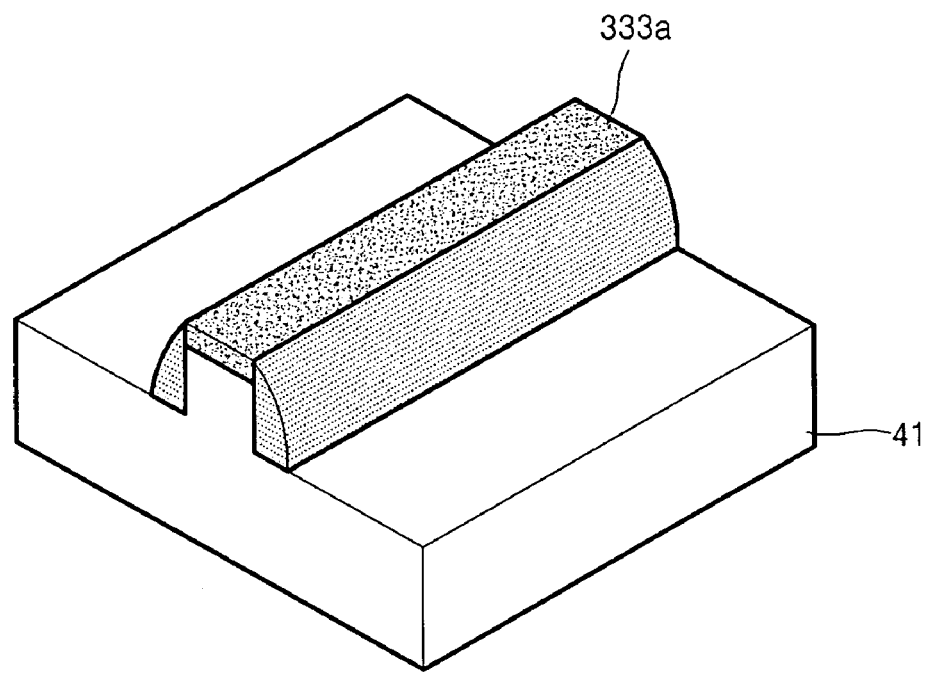

Referring to FIG. 4D, in order to form the doping control layers 45 (see FIG. 4E) on the substrate 41, an insulation material such as $SiO_2$ or a metal material such as Al, Ti, W, Sn, or Cr is deposited on the substrate 41 and an anisotropic etching process is performed in a direction perpendicular to the substrate 41, thereby exposing a surface of the substrate 41. The doping control layers 45 are formed on both side surfaces of the stripe pattern protruding portion. At this point, a width of the doping control layer 45 is less than one-third of the height of the stripe pattern protruding portion.

Figure 4E:
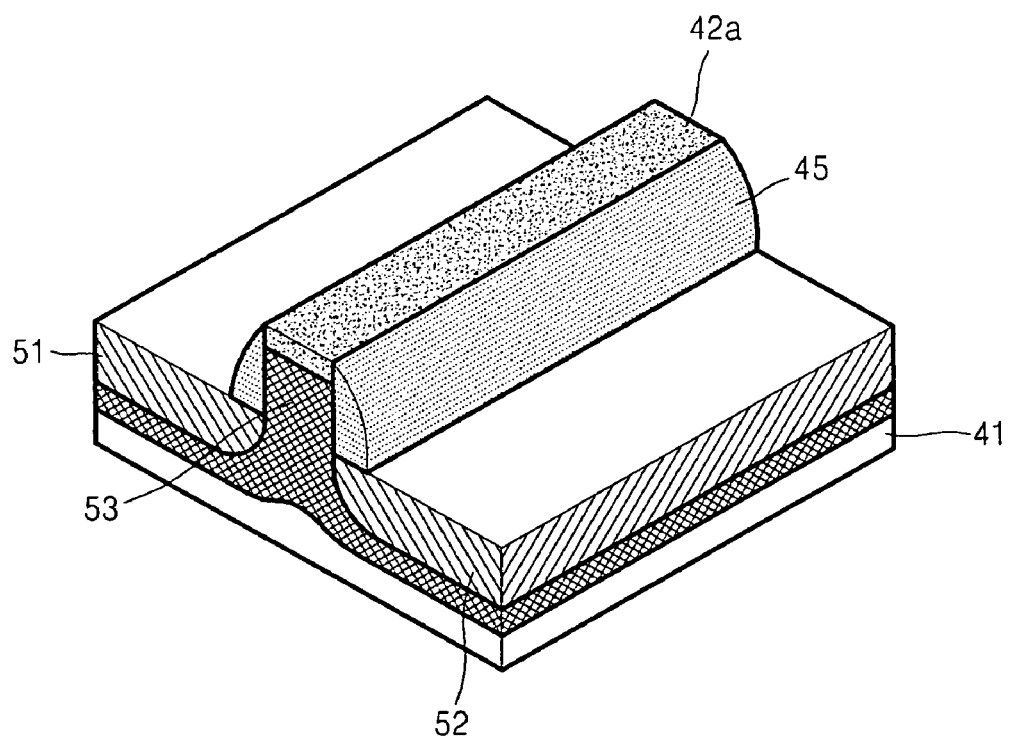

Referring to FIG. 4E, the substrate is heavily doped with the second impurities, i.e., as through the exposed surface of the substrate 41 to form the first and second electrode regions 51 and 52. At this point, the ion implantation energy may be lowered, for example, 10 keV. That is, because there is no etching process for the first and second electrode regions 51 and 52, the depths of the first and second electrode regions 51 and 52 can be reduced and thus the ion implantation energy can be lowered.

After the ion implantation process is finished, a rapid thermal annealing process is performed to activate the doped impurities. For example, the rapid thermal annealing process is performed at a temperature of 1000° C. for several seconds or several minutes. Since the rapid thermal annealing process for activating the doped impurities is performed after the doping control layers 45 are formed, a phenomenon where the first and second electrode regions 51 and 52 contact each other through a lower portion of the resistive tip during the rapid thermal annealing process can be prevented.

Figure 5:
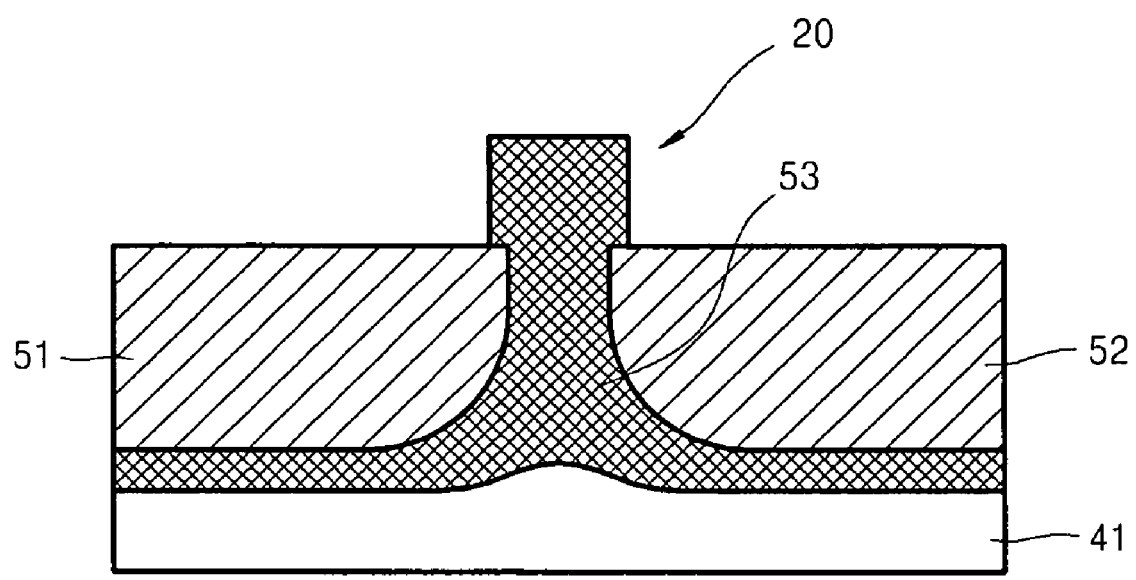
FIG. 5 is a view of an example when first and second electrode regions are formed without forming doping control layers.

FIG. 5 is a view of an example when the first and second electrode regions 51 and 52 are formed without forming the doping control layers 45. In this case, the second impurities of the first and second electrode regions 51 and 52 are diffused so as to extend the first and second electrode regions 51 and 52 into the stripe pattern protruding portion 53. At this point, if the width of the stripe pattern protruding portion 53 is very narrow, the first and second electrode regions 51 and 52 may contact each other. Therefore, by forming the doping control layers 45 as shown in FIG. 4E, even when the width of the stripe pattern mask 42a is very narrow, a short circuit between the first and second electrode regions 51 and 52 and the reduction of the resistive region area between the first and second electrode regions 51 and 52 can be prevented. The resistances of the first and second electrode regions 51 and 52 are very low so that the first and second electrode regions 51 and 52 function as conductive regions.

When the rapid thermal annealing process is performed, the portion between the heavily doped first and second electrode regions 51 and 52 is lightly doped with the second impurities due to the thermal diffusion. That is, the portion under the stripe pattern protruding portion 53 and the first and second regions 51 and 52 may be a region of low resistance that is lightly doped with the second impurities by the thermal diffusion. Alternatively, the region of low resistance may be formed in advance by lightly doping the silicon substrate 41, which is already doped with the first impurities, with the second impurities.

The stripe pattern mask 42a may be removed after the ion implantation process is finished or after other processes that follow are complete.

Figure 4F:
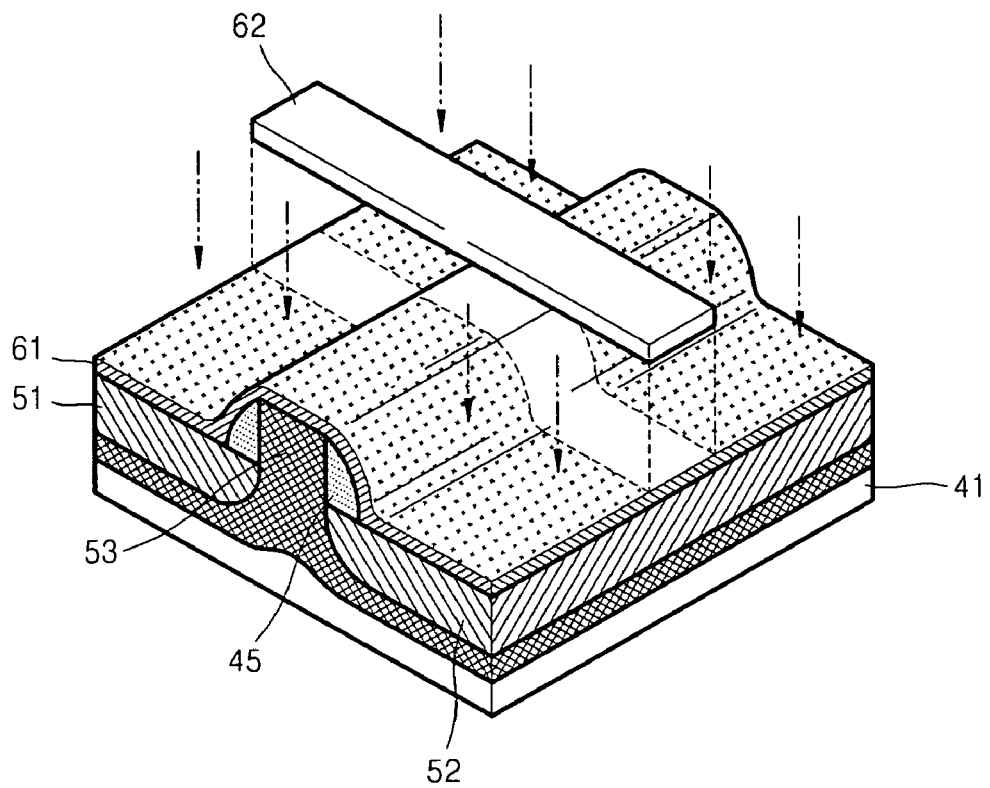

Referring to FIG. 4F, a photosensitive layer 61 is formed on a top surface of the resulting structure of FIG. 4E, a stripe pattern photo mask 62 is disposed above the photosensitive layer 61 in a direction crossing the stripe pattern protruding portion 53 at a right angle.

Figure 4G:
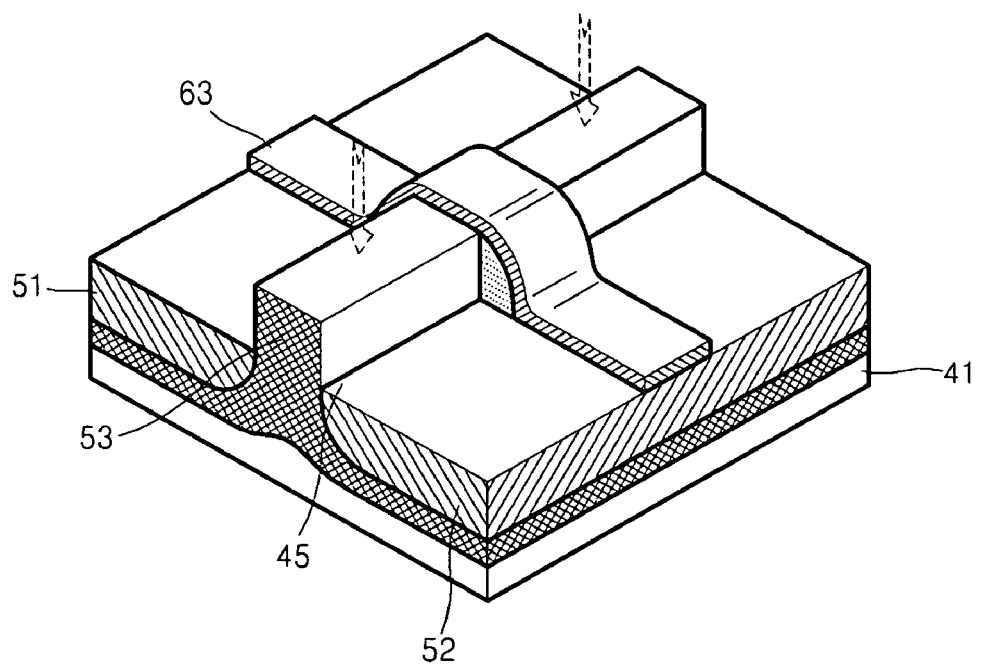

Referring to FIG. 4G, light-exposing, developing and etching processes are performed on the photosensitive layer 61 to form a stripe pattern photosensitive layer 63 identical in shape to the stripe pattern photo mask 62.

Figure 4H:
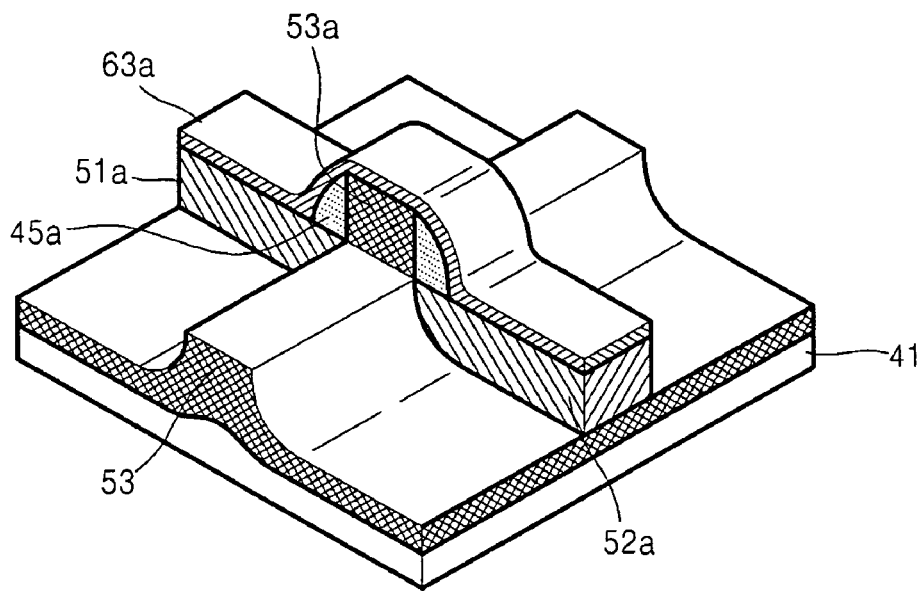

Referring to FIG. 4H, the stripe pattern protruding portion 53 is etched using the stripe pattern photosensitive layer 63 as a mask to form a square pillar protrusion that will be the resistive tip 53a. At this point, it is clear that the exposed surface of the substrate 51 that is not under the stripe pattern photosensitive layer 63a is also etched.

Figure 4I:
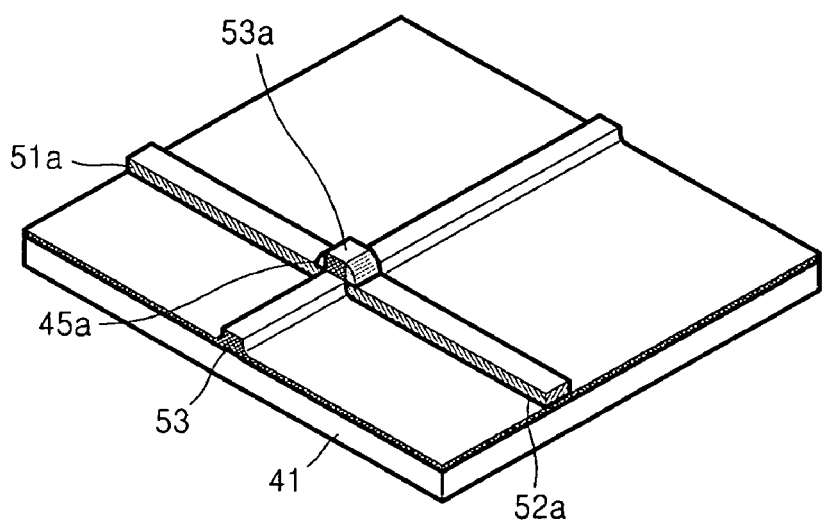

Referring to FIG. 4I, when the stripe pattern photosensitive layer 63a is removed from the substrate, the resistive tip 53a is formed in a square pillar shape and is exposed on the substrate 41 with the doping control layers 45a formed on the both side surfaces of the tip 53a. The first and second electrodes 51a and 52a are formed under the doping control layers 45a.

Then, a bottom surface of the substrate 41 is etched to form the cantilever so that the resistive tip 53a is located on one end of the cantilever and electrode pads are connected to the first and second electrode regions 51a and 52a. Since the process for forming the cantilever is well known to those of ordinary skill in the art, the detailed description thereof will be omitted.

Figure 6A:
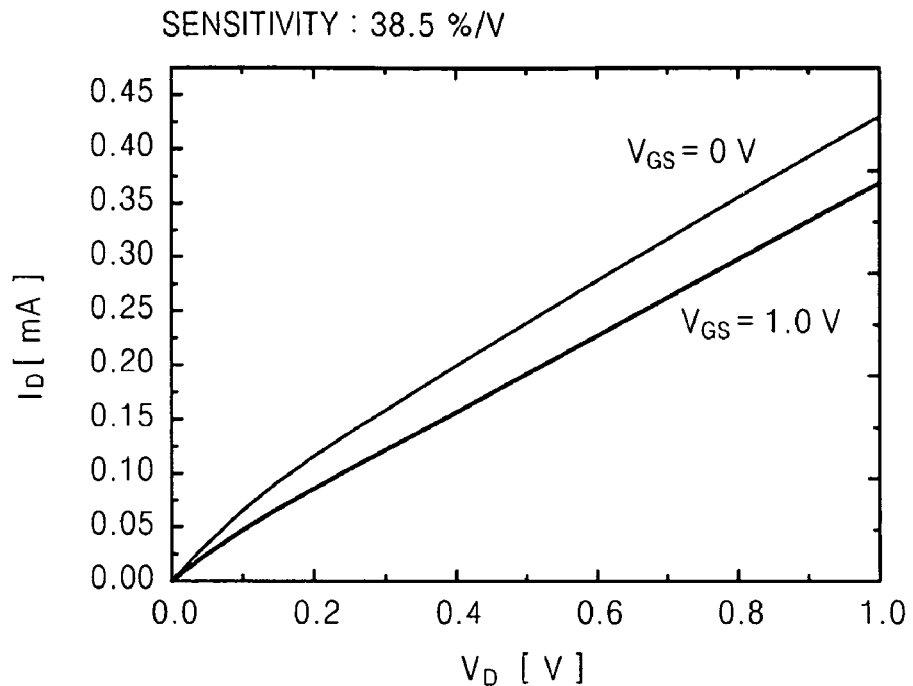
FIGS. 6A and 6B are graphs illustrating electrical properties of the related art semiconductor probe without a doping control layer, and the semiconductor probe with the doping control layer according to an exemplary embodiment of the present invention.
Figure 6B:
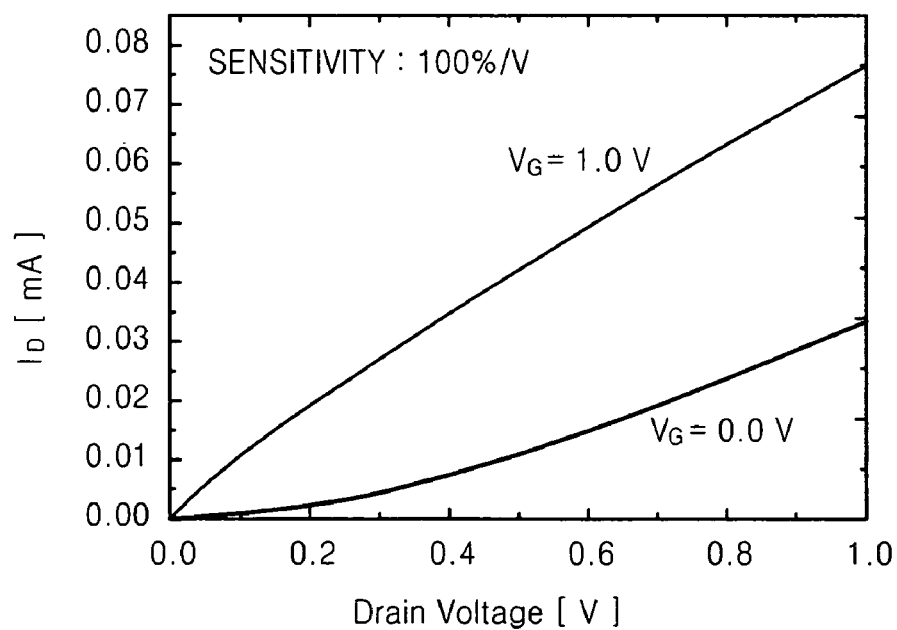

FIGS. 6A and 6B are graphs illustrating a simulation result of electrical properties, i.e., sensitivities, of the conventional semiconductor probe without the doping control layer and the semiconductor probe with the doping control layer using a transaction TC drive (TACD). For the simulation, a gate electrode is located above the resistive tip and a current is supplied between the first (source) and second (drain) electrode regions. In addition, a gate voltage of 0V or 1.0V is applied to the gate electrode and a voltage of 0 to 1.0V is applied to the first and second electrode regions.

FIG. 6A shows that there is little difference in drain current between a case when a gate voltage of 0V is applied and a case when a gate voltage of 1V is applied. FIG. 6B shows that when a gate voltage of 1V is applied, the drain current increases twice as much compared with a case when a gate voltage of 0V is applied. This shows that, when the doping control layer is formed, the sensitivity dramatically increases.

Figure 7A:
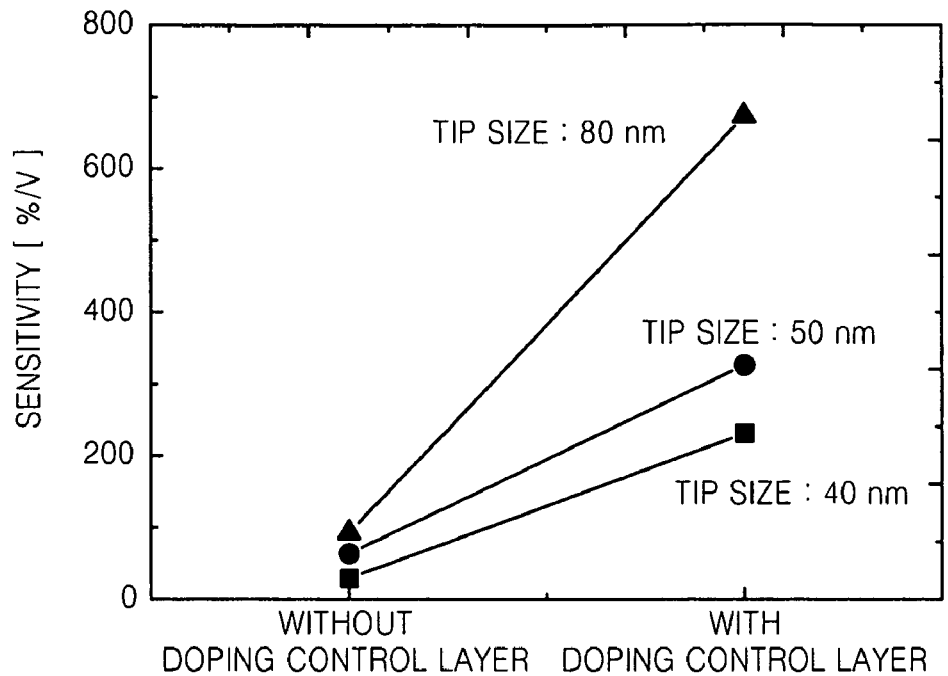
FIGS. 7A and 7B are graphs illustrating sensitivity and resolution properties of the related art semiconductor probe without the doping control layer and the semiconductor probe with the doping control layer according to an exemplary embodiment of the present invention.

FIG. 7A is a graph illustrating the sensitivities of the conventional semiconductor probe and the semiconductor probe, according to an exemplary embodiment of the present invention, with the widths of the resistive tips varying according to whether the doping control layer is formed or not. Three resistive tips having widths of 40, 50 and 80 nm, respectively, are formed. When the semiconductor probes with the resistive tips on which the doping control layer is formed are compared with the semiconductor probes with the resistive tips on which the doping control layer is not formed, as shown in FIG. 7A, the sensitivity of the semiconductor probe having the doping control layer is shown to dramatically increase regardless of the width of the resistive tip.

Figure 7B:
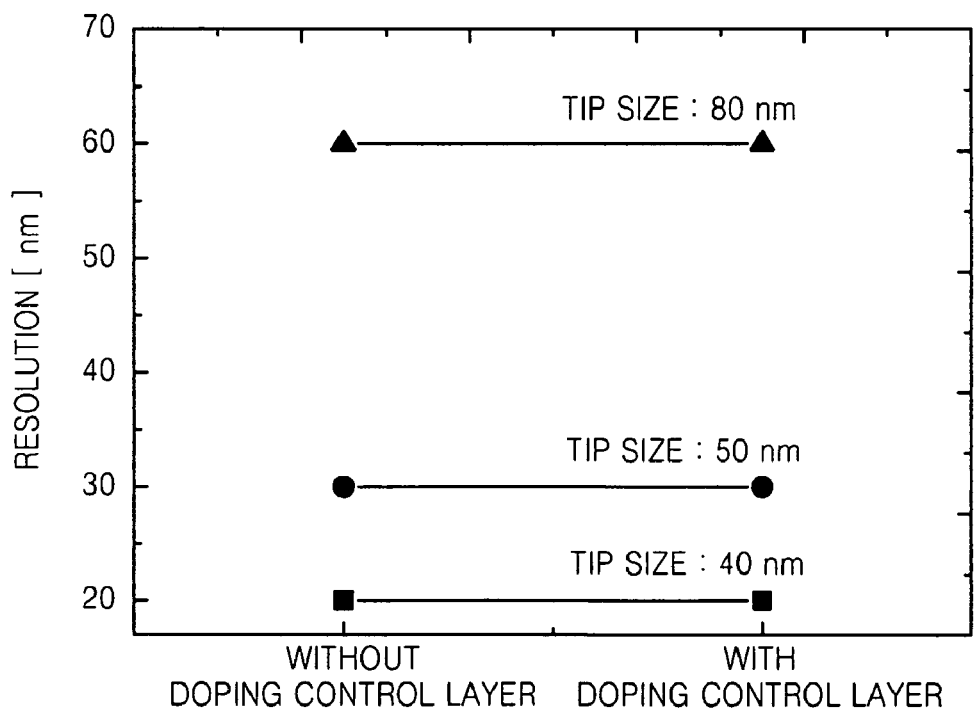

FIG. 7B is a graph illustrating resolutions of the semiconductor probes of FIG. 7A. Referring to FIG. 7B, when the tips are identical in a width from each other, the resolutions of the tips are also identical to each other regardless of whether the doping control layer is formed or not. This shows that the resolution of the semiconductor probe according to the present invention is very good as compared with the related art semiconductor probe having a resolution of hundreds of nm. That is, it is clear that, although the resistive tip of the inventive semiconductor probe has a width of tens of nanometers, the resolution thereof is improved as the first and second electrode regions are formed at both sides of the resistive tip.

Consistent with the present invention, by forming the doping control layers on both sides of the resistive tip, the lower conductive regions can be effectively formed even when a width of the resistive tip is very narrow. Therefore, the sensitivity of the semiconductor probe can dramatically increase without lowering the resolution of the resistive region.

In addition, since the ion implantation is performed with a relatively low energy, damage to the probe can be prevented. Furthermore, since there is no need to perform the ion diffusing process for a long period of time, the distribution of the impurities can be precisely controlled, thereby making it easier fabricate a desired probe.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A semiconductor probe comprising:
   a cantilever doped with first impurities;
   a resistive tip which protrudes from an end of the cantilever and which is doped lightly with second impurities;
   doping control layers formed on opposite sides of a protruding portion of the resistive tip; and
   first and second electrode regions formed under the doping control layers and doped heavily with the second impurities.

2. The semiconductor probe of claim 1, wherein the resistive tip is formed in a square pillar shape and has a width less than 100 nm.

3. The semiconductor probe of claim 2, wherein the width of the resistive tip is within a range of 10-50 nm.

4. The semiconductor probe of claim 1, wherein the doping control layer comprises at least one of an insulation material and a metal material.

5. The semiconductor probe of claim 4, wherein the metal material is selected from Al, Ti, W, Sn, Cu, and Cr.

* * * * *